United States Patent Office 3,481,766
Patented Dec. 2, 1969

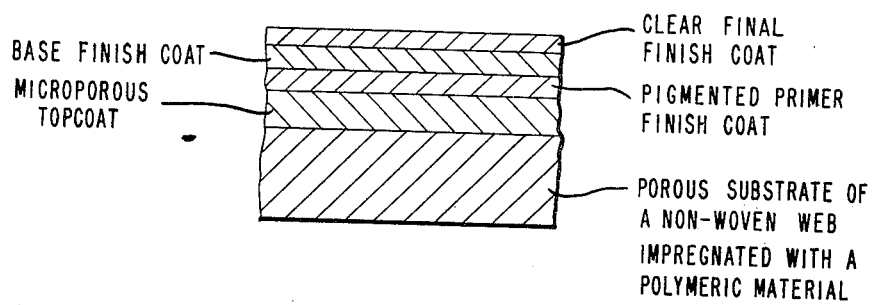

3,481,766
SYNTHETIC MICROPOROUS POLYMERIC SHEET
MATERIAL
James M. Craven, Wilmington, Del., John I. Dye, West
Chester, Pa., and Jerome Hochberg, Nashville, Tenn.,
assignors to E. I. du Pont de Nemours and Company,
Wilmington, Del., a corporation of Delaware
Continuation-in-part of application Ser. No. 520,076,
Jan. 12, 1966. This application Dec. 29, 1966, Ser.
No. 605,162
Int. Cl. B44d 1/14, 1/32; D21h 1/10
U.S. Cl. 117—76
40 Claims

ABSTRACT OF THE DISCLOSURE

A coriaceous synthetic microporous sheet material of
(1) a porous substrate of a fiber reinforced synthetic polymeric material having a synthetic microporous polymer coating and
(2) about 0.1–5 mils of a nonporous vapor permeable finish in superimposed adherence with said microporous coating in which the finish comprises an elastomeric polymer that has at least 40% of soft polymeric segments having a glass transition temperature below −20° C. and up to 60% by weight hard polymer segments.

---

This application is a continuation-in-part of the co-pending application Ser. No. 520,076, filed Jan. 12, 1966.

This invention concerns a microporous synthetic sheet material useful for making shoe uppers, ladies' handbags, purses, belts and the like. In particular, this invention relates to a synthetic microporous coriaceous sheet material which has excellent water vapor permeability, superior flexibility, scuff and crack resistance.

Coriaceous synthetic microporous sheet materials are commercially available, but the finishes on these products break down under ordinary use, by microcracking, checking and flaking of the coating, particularly, when the microporous material is used as the upper for shoes. Obviously, this adversely affects the appearance of articles made from these microporous materials, such as shoes, and necessitates that these articles be frequently polished and buffed.

Another unexpected problem arises because of microcracking and checking of the finishes of the coriaceous synthetic microporous sheet material when used for shoe uppers. Residual salts from either the leather sole or from the wearer wick into the microporous upper of the shoe and exude out through the microcracks and checks of the finish, giving the shoes a dull white milky appearance. These salt deposits are not easily removed by simple buffing but require washing and polishing of the shoe.

The novel coriaceous synthetic microporous sheet material of this invention has a finish which is resistant to these aforementioned problems of microcracking, checking and flaking and has excellent abrasion and scuff resistance and also has a high water vapor permeability.

The novel product of this invention is a water vapor permeable coriaceous synthetic microporous sheet material comprising:

(1) A foundation material of a porous substrate of a synthetic polymeric material reinforced with fibers having adhered thereto a microporous synthetic polymer coating (A), and (2) about 0.1–5 mils of non-porous vapor permeable finish (B) in superimposed adherence with said microporous coating (A) and comprises an elastomeric polymer containing:

(a) At least 40% by weight of soft polymeric segments that are from a polymer that has a glass transition temperature below −20° C. and contains about 10–50% by weight of an element that is either oxygen or nitrogen or a mixture of oxygen and nitrogen, and (b) Complementarily up to 60% by weight of hard polymeric segments that are from a group of polymers that either have a glass transition temperature above 50° C. or a crystalline melting point above 100° C. or have a softening temperature above 100° C.

The elastomeric polymer used for the finish (B) when in the form of an unsupported film has a permeability constant for water vapor of at least 3000, a stress at 100% elongation of 50–4000 pounds per square inch (p.s.i.), a permanent set of less than 20%, and a tensile strength of at least 300 p.s.i.

Preferably, the elastomeric polymer of the non-porous vapor permeable finish (B) of the sheet material of this invention contains 60–80% by weight soft polymer segments and complementally 40–20% by weight hard polymeric segments, and preferably, the elastomeric polymer in the form of an unsupported film has a permeability constant for water vapor of 9,000–50,000, a stress at 100% elongation of about 200–1500 p.s.i. and a tensile strength of about 3,000–50,000 p.s.i.

Any flexible and durable sheet material is suitable as the foundation material for this invention as long as it is microporous. However, a preferred foundation material is prepared by coating a porous fibrous polymer impregnated substrate with a colloidal dispersion of a polymeric material in which the polymeric component has a secant tensile modulus of above about 600 pounds per square inch during the following bathing and drying condition of the coating process, bathing the coated substrate with a non-solvent for the polymeric component to coagulate the polymeric component into a microporous structure and drying the resulting microporous product. One preferred sheet material is prepared according to U.S. patent application Ser. No. 355,436 to Bateman, filed Mar. 27, 1964, now abandoned and the disclosure of this patent application is hereby incorporated herein and made a part hereof.

The term "non-porous" as used herein describing this invention refers to a sheet material or a coating of a synthetic polymeric material that is free from visible pores by the naked eye.

The term "porous" refers to coatings and sheet materials which do not meet the test of non-porosity as set forth above. "Microporous" refers to a porous material in which the pores are not discernable to the naked eye.

The term "permeability constant for water vapor" is a value that has the units of $$\frac{\text{grams of water} \cdot \text{mil of film}}{100 \text{ square meters of film} \cdot \text{hour} \cdot 2.14 \text{ cm. Hg water vapor pressure differential}}$$

This value is determined by measuring the water vapor permeability of a series of films 1 to 10 mils thick. The film is sealed to the top of a cup containing $CaCl_2$ and the cup is stored at 90% relative humidity. The weight increase of the cup due to moisture permeating through the film is determined and the permeability value of the sheet in $$\frac{\text{grams of water}}{100 \text{ square meters of film} \cdot \text{hour} \cdot 2.14 \text{ cm. Hg water vapor pressure differential}}$$

is calculated. A graph is then plotted with these values wherein the reciprocal of the permeability value vs. thickness (in mils) and then a straight line is drawn through the point. The reciprocal of the slope of the straight line is the aforementioned permeability constant.

Stress at 100% elongation is the force in pounds which is required to elongate a sample 100% divided by the initial cross-sectional area of the sample in square inches with the results being in pounds per square inch. Preferably, a 5–10 mil thick film of the elastomeric polymer material used as a finish for the novel sheet material of this invention is prepared and test samples ½ inch by 2 inches are cut, conditioned at 50% relative humidity and tested at 25° C. The samples are tested in an Instron Tensile Tester using about 1 inch between grips on the sample, a cross-head speed of 1 inch per minute and a chart speed of 1 inch per minute.

The term "permanent set" is a value which indicates to the extent a polymeric material will deform after being subjected to a given strain. Preferably, permanent set is determined from a polymeric film sample about 5–10 mils thick, 0.5 centimeter wide and about 10 centimeters long. Two lines are drawn 5 centimeters apart on the sample and the sample is rapidly stretched with sufficient force until the two lines are 10 centimeters apart and held in this position for 10 seconds. The force is then released and the sample is allowed to relax for 30 seconds, then the distance between the two lines is measured. The permanent set is calculated dividing the increase of sample length by the original sample length and multiplying by 100.

The non-porous vapor permeable finish used on the microporous foundation material to form the novel sheet material of this invention is an elastomeric polymer having hard and soft polymeric segments. The soft and hard polymeric segments are chemically bonded in the elastomeric polymer, for example, the soft segment can be a high molecular poly(alkyleneether) glycol which is reacted with a hard segment of an isocyanate terminated polyurethane. This elastomeric polymer is at least 40% by weight of the aforementioned soft segments and complementally up to 60% by weight of hard polymeric segments and under certain circumstances can consist of essentially 100% of the soft polymeric segments. Preferably, however, the soft polymeric segment present in the elastomeric polymer for the finish composition is about 60–80% by weight of the polymer with the hard polymeric segment being about 40–80% by weight of the polymer.

The soft polymeric segments of the elastomeric polymer are from polymers that have the following physical properties:

(1) A glass transition temperature below —20° C. and preferably, a glass transition temperature below —60° C.; and (2) The soft segment should contain about 10–50% by weight of oxygen or nitrogen or a mixture thereof and preferably, the soft segment should contain 20–40% by weight of the aforementioned constituents.

The molecular weight of the soft polymeric segment may be from about 500 up to 1,000,000. If the elastomeric polymer is 100% soft segments, a molecular weight of 20,000 to 1,000,000 is required to provide a durable elastomeric polymer suitable for the finish on the novel coriaceous sheet material of this invention. Preferably, the soft polymeric segment is used with a hard polymeric segment to form the elastomeric polymer, then the molecular weight of the soft polymeric segment is about 500–5,000.

The following are some examples of typical polymers that fill the aforementioned requirements and are used for the soft polymeric segments of the elastomeric polymer used as a finish to form the novel coriaceous synthetic microporous sheet material of this invention: a poly(alkyleneether) glycol having a glass transition temperature of about —40° C. to —90° C., and preferably having a molecular weight of about 500–5,000 and more preferably, about 1500–3000, such as poly(propyleneether) glycol, poly(tetramethyleneether) glycol, a mixture of poly(tetramethyleneether) glycol and poly(ethyleneether) glycol; a polyester having a glass transition temperature of about —40 to —70° C., and preferably having a molecular weight of 500–5000, such as a polyester from 3 to 12 carbon atom aliphatic dicarboxylic acid and a 3 to 12 carbon atom glycol, for example, poly(ethylene adipate), poly(tetramethylene adipate) or poly(epsiloncaprolactone); poly(siloxane), i.e., a dialkyl or alkyl-aryl siloxane, such as poly(dimethylsiloxane) having a degree of polymerization of at least 18 or phenylmethyl siloxane having a degree of polymerization of at least 6; poly(vinyl alkyl ether) having a glass transition temperature of —20° C. to —60° C., such as poly(vinyl isobutyl ether); poly(alkyl acrylate) having a glass transition temperature of —20 to —70° C. in which the alkyl group has from 1–8 carbon atoms, such as, poly(ethyl acrylate) and poly(butyl acrylate); and a hydrocarbon copolymer wherein the hydrocarbon units have 2–12 carbon atoms and the polymer has a glass transition temperature of —30 to —80° C., such as a copolymer of ethylene/vinyl acetate containing about 40–70% by weight of units of vinyl acetate and complementally 60–30% by weight of units of ethylene.

The hard polymeric segments of the elastomer polymer generally have a molecular weight of about 70–5,000 and are from polymers that have at least one of the following requirements:

(1) Glass transition temperature above 50° C.;
(2) Crystalline melting point above 100° C.; and
(3) A softening temperature of above 100° C.

The following are some examples of polymers which can be used as hard polymeric segments for the finish composition which is applied to a microporous foundation material to form the novel coriaceous synthetic product of this invention: polyureas, polyurethanes, polyesters, polycarbonates, polystyrenes and polyacrylonitriles.

Isocyanate terminated polyureas are useful as hard polymeric segments and are formed by reacting organic diisocyanates with a diamine. These isocyanate terminated segments readily react with poly(alkyleneether) glycols or hydroxyl terminated polyesters to form the elastomeric polymer used to make the novel sheet material of this invention. Typically useful isocyanates are aromatic, aliphatic or cyclo aliphatic and are toluene 2,4-diisocyanate, xylylene diisocyanate, m-phenylene diisocyanate, methylene bis - 4 - phenyl isocyanate, 4,4' - methylene bis-(cyclohexyl isocyanate) and hexamethylene diisocyanate.

Typical diamines that are useful to form the aforementioned polyureas are hydrazine, mono-substituted hydrazines and ethylene diamine. Preferably, secondary diamines are used since these provide an elastomeric polymer which dissolves in common solvents, such as toluene and ethanol which do not readily degrade the polymer of the foundation material as do solvents, such as dimethyl formamide and dimethyl acetamide that are generally required to dissolve polyureas of primary diamines. Useful secondary diamines are piperazine, 2,5-dimethylpiperazine, N,N'-dimethyltetramethylene diamine, N,N'-dimethylphenylene diamine, N,N'-dimethyl-p-xylylene diamine, N,N'-dimethyl-1,4-diaminocyclohexane, 1,3 - bis-(4-piperidyl)propane, N,N'-dimethylethylene diamine, N,N'-di-n-propyl-1,6-hexanediamine, N,N' - diethyl - 1,6 - hexanediamine, N,N'-bis-(2 - hydroxyethyl)ethylenediamine and N,N'-bis-(furfuryl)-1,6-hexanediamine.

Polyurethanes are useful as the hard segments of the elastomeric polymer, particularly isocyanate terminated polyurethanes which are formed by reacting an organic diisocyanate with an alkyleneether glycol. Typically useful alkylene glycols are, for example, ethylene glycol, propylene glycol, 1,4-butane diol and the like; while typically useful organic diisocyanates are any of these aforementioned which are useful for forming the polyureas. The terminal isocyanate groups on the polyurethane segment are reacted with the polymeric soft segments, such as a high molecular weight polyalkyleneether glycol or a hydroxyl terminated polyester to form the elastomeric polymer of the finish used to form the novel synthetic microporous sheet material of this invention.

Polyurethanes formed by reacting the bis-haloformate of a low molecular weight glycol and a diamine are also useful and are readily reacted with the bis-haloformate of a soft polymeric segment to form the elastomeric polymer of the finish used to form the novel coriaceous sheet material of this invention. Typically useful diamines are any of those aforementioned used to form the polyureas while typically useful glycols which are readily formed into a bis-haloformate by reacting the glycol with a compound such as phosgene, are any of the aforementioned used to form the isocyanate terminated polyurethane. One preferred polyurethane of this type is the reaction product of the bis-chloroformate of 1,4-butane diol and piperazine.

Other useful polymers for the hard polymeric segment are polyesters of an aromatic dicarboxylic acid and an aliphatic glycol having a glass transition temperature above 50° C., such as poly(ethylene terephthalatet), poly(tetramethylene terephthalate). Preferably, a carboxyl terminated polyester, is used as the hard segment which is reactive with a polyalkyleneether glycol or a hydroxyl terminated polyester to form the elastomeric polymer used as a finish to form the novel coriaceous sheet material of this invention.

Polycarbonates having a glass transition temperature of about 125–225° C. can also be used as the hard segment for the elastomeric polymer. Preferably, the polycarbonate is of the formula:

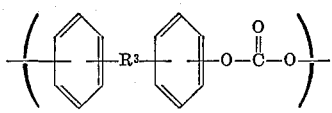

or of the formula

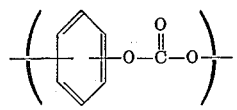

wherein R³ is a difunctional hydrocarbon radical of 1–15 carbon atoms. Substituted phenylene radicals can be used in the above polycarbonates, for example, chlorine can be substituted for the hydrogen on the phenylene radical.

One preferred polycarbonate has the structural formula

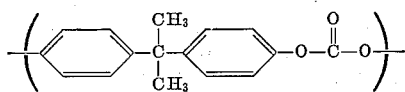

and has a glass transition temperature of 145–155° C. This preferred polycarbonate is formed by reacting 4,4'-isopropylidene diphenol and phosgene.

Vinyl addition polymers, such as polystyrene and polyacrylonitrile can also be used as the hard polymeric segment but generally have a molecular weight in the range of 100–200,000.

Another synthetic permeable elastomer that is useful as a finish composition to form the novel coriaceous sheet material of this invention comprises a polymer having at least one soft polymeric segment and at least two hard polymeric segments which alternate along the polymer chain and preferably, is a block copolymer having at least 10 each of hard and soft segments alternating along the polymer chain. The following are typical examples of the above permeable elastomer compositions:

(1) Poly(ether/urethane/urea)—the reaction product of a poly(alkyleneether) glycol, an organic diisocyanate and a secondary diamine; for example, poly(tetramethyleneether) glycol molecular weight about 1500–3000, hexamethylene diisocyanate and piperazine reacted in a molar ratio of 1/1.5/0.5–1/4/3 and poly(tetramethyleneether) glycol molecular weight about 1500–3000, 4,4'-methylene bis-(cyclohexyl isocyanate) and piperazine reacted in a molar ratio of 1/1.25/0.25–1/2/1;

(2) Poly(ether/urethane)—the reaction product of a poly(alkyleneether) glycol, an organic diisocyanate and a glycol, for example, poly(tetramethyleneether) glycol molecular weight about 1500–3000, 4,4'-methylene bis-(cyclohexyl isocyanate) and 1,4-butane diol reacted in a molar ratio of 1/1.25/0.25–1/4/3;

(3) Poly(ether/urethane)—the reaction product of bis-chloroformate of a poly(alkyleneether) glycol, the bis-chloroformate of a low molecular weight glycol and a secondary diamine having 3–18 carbon atoms, for example, the reaction product of a bis-chloroformate of polytetramethyleneether glycol, bis-chloroformate of butane diol and piperazine;

(4) Poly(ester/ureas)—the reaction product of a polyester glycol, an organic diisocyanate and a secondary diamine; for example, hydroxyl terminated poly(epsilon-caprolactone) molecular weight 2000, 4,4'-methylene bis-(cyclohexyl isocyanate) and piperazine;

(5) Poly(ester/urethanes)—the reaction product of a poly(ester) glycol, an organic diisocyanate and a glycol, for example, the reaction product of hydroxyl terminated poly(tetramethylene adipate), diphenyl methane-p,p'-diisocyanate and 1,4-butane diol;

(6) Poly(ether/ester)—the reaction product of a poly(ester) and a poly(alkyleneether) glycol and a low molecular weight glycol, for example, poly(tetramethyleneether) glycol molecular weight 2000, dimethyl terephthalate and 1,4-butane diol;

(7) Poly(ester/ester)—the reaction product of a carboxyl terminated polyester and a hydroxyl terminated polyester, such as hydroxyl terminated poly(ethylene terephthalate), and carboxyl terminated poly(ethylene adipate);

(8) Poly(ether/vinyl)—the reaction product of a poly(alkyleneether) glycol and a vinyl addition type polymer, such as styrene or acrylonitrile, for example, a peroxide terminated prepolymer is formed by reacting 2 moles of toluene diisocyanate, with 1 mole of poly(tetramethyleneether) glycol and then with 2 moles of t-butylhydroperoxide; this prepolymer then can be polymerized with a vinyl addition monomer such as styrene or acrylonitrile;

(9) Poly(siloxane/siloxane)—for example, a polymer of poly(dimethyl siloxane) and p-bis-(dimethylhydroxysilyl) benzene.

Another polymer composition that is useful for the finish to form the novel coriaceous sheet material of this invention is a water vapor permeable elastomer in which at least 60% by weight of the polymer molecules consist entirely of high molecular weight, i.e., having a molecular weight greater than 30,000, of soft polymeric segments in which the soft segment molecules are chemically cross-linked. Typical examples of these types of polymers are: acrylic ester rubbers, silicone rubbers, vulcanized ethylene/vinyl acetate copolymers. A preferred finish composition of this type is the reaction product of a poly(alkyleneether) glycol, a triol and an organic diisocyanate which is cross-linked by reaction with water or another chain-extending compound having at least two reactive hydrogen atoms attached to separate amino nitrogen atoms.

The following poly(ether/urethane/urea) polymers are particularly preferred and are useful as a finish to form the novel coriaceous sheet material of this invention. These polymers are the reaction product of:

(a) 1 mole of a poly(alkyleneether) glycol with a molecular weight greater than 500 and preferably, a molecular weight of 1000–3000; up to 0.5 mole of poly(alkyleneether) glycol can be replaced with a low molecular weight glycol, such as 1,4-butane diol;

(b) 1.1–4.0 moles, and preferably 1.5–2 moles of an aliphatic, aromatic of cycloaliphatic diisocyanate, preferably, aliphatic diisocyanates are used on light colored finishes where discoloration of the finish polymer presents a problem, however, with dark finishes, such as black or brown, an aromatic diisocyanate is used; and (c) A secondary diamine in a sufficient amount to react with all the isocyanate terminal groups which remain from the reaction of the glycol and the diisocyanate.

The aforementioned components (a), (b) and (c) should be chosen preferably so that the sum of the weight of the elements of oxygen and nitrogen in the polymer is about 20–32% by weight, the weight of the polymer.

One specifically preferred of the above poly(ether/urethane/urea) is the reaction product of 1 mole poly(tetramethyleneether) glycol molecular weight about 2000, 1.9 moles of 4,4'-methylene-bis-(cyclohexyl isocyanate), (20% trans-trans isomer), and 0.9 mole piperazine. This reaction product is soluble in a solvent of toluene/isobutyl alcohol/water in a weight ratio of 20/70/10.

Another specifically preferred of the above poly(ether/urethane/urea) is the reaction product of 1 mole poly(tetramethyleneether) glycol molecular weight about 2000, 2 moles hexamethylene diisocyanate and 1 mole piperazine. This polymer is soluble in a solvent of a 50:50 mixture of toluene/isopropyl alcohol.

Another specifically preferred composition which is useful as a finish to form the novel coriaceous sheet material of this invention is a poly(ether/urethane/ester) which is the reaction product of 1 mole poly(tetramethyleneether) glycol molecular weight about 2000, 2 moles of 4,4'-methylene-bis-(cyclohexyl isocyanate), (50% trans-trans isomer), and 1 mole of 1,4-butane diol. This reaction product is soluble in a solvent of a 50:40:10 mixture of toluene/isopropyl alcohol/water.

The amount of non-porous vapor permeable finish required to form the novel coriaceous microporous sheet material of this invention is about 0.1–5.0 oz./square yard and more preferably, 0.2–0.5 oz./square yard (dry weight basis). The thickness of the finish after it is dried and in firm adherence to the synthetic microporous sheet, is about 0.1–5 mils, preferably 0.1–2 mils, but more preferably, the finish is about 0.2–0.5 mil thick. When the microporous material is to be used as a leather replacement in shoes, it is often preferable to have a finish of two separate layers; the first layer of finish compositions contains a large amount of pigment, such as titanium dioxide, for hiding defects on the surface of the synthetic microporous foundation material and the second layer of finish contains the desired pigments to provide the necessary color for the material, or this second finish coat may be clear if the first coat gives the substrate the desired color. Preferably, a final coat is applied to the synthetic microporous foundation material, such as cellulose acetate butyrate, to provide a glossy surface. This final coat may be clear or pigmented depending on the aesthetics required for the novel coriaceous sheet material of this invention.

One preferred embodiment of the vapor permeable coriaceous synthetic microporous sheet material of this invention can readily be understood by reference to the figure which illustrates a cross-section of the sheet material of this invention. In the figure, a porous substrate of a non-woven web that is impregnated with a synthetic polymeric material and that preferably has a microporous chain-extended polyurethane topcoat about 10–30 mils thick has a primer finish of a thickness of about 0.1–4 mils. This primer finish is pigmented and contains pigment in about 10–50% by volume of polymer, such as titanium dioxide, to hide the surface defects of the synthetic microporous foundation material. A base finish is in firm adherence with the primer finish and is about 0.1–1 mil thick and is clear or colored by dyes or pigments depending on the color desired in the final coriaceous product of this invention. A clear final coat, such as cellulose acetate butyrate, is in firm adherence with the base coat to provide a glossy surface.

The finish can be applied to the synthetic microporous foundation material by a variety of methods. For example, the finish can be formed into a film and laminated to the surface of the foundation material. Preferably, the finish is applied from a solution by any of the well known methods, for example, spraying, roller coating, dipping, swabbing, brushing, padding or printing; spraying and dip coating are preferred methods for applying the finish to form the novel sheet material of this invention.

One preferred embodiment of the novel microporous sheet material of this invention which has excellent scuff and abrasion resistance is formed by applying a primer finish of one of the aforementioned elastomeric polymers to a synthetic microporous foundation material and then applying a thin coat of an acrylic polymer having a thickness when dry of about 0.1–1 mil. The aqueous acrylic polymer dispersion which is used as this coat to form this preferred material of this invention has a pH of about 7–10, a polymer solids content of about 10–50% by weight, preferably 20–40% by weight, and contains pigment in a pigment volume concentration of up to 50%. Preferably, the acrylic polymer used in the dispersion is a terpolymer of about 1–6% by weight of units of an $\alpha,\beta$-unsaturated monovinylidene carboxylic acid, e.g., acrylic acid or methacrylic acid, units of a methacrylic acid ester and units of an acrylic acid ester. These esters should be of a $C_1$–$C_{12}$ saturated aliphatic monohydric primary alcohol. Preferred acrylic polymer compositions are, for example, ethyl acrylate/methyl methacrylate/methacrylic acid, and methyl methacrylate/2-ethylhexyl acrylate/methacrylic acid. To have the required strength and flexibility required for a shoe upper material, the acrylic polymer should have a tensile strength of at least 300 pounds per square inch and an elongation at break of at least 300%.

To increase the adhesion of the aforementioned acrylic polymer to the elastomeric polymer finish, the carboxyl groups of the polymer are reacted at about 35–70° C. with an alkylene imine of the formula

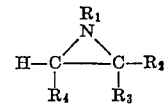

wherein $R_1$, $R_2$, $R_3$ and $R_4$ are either hydrogen or a $C_1$–$C_5$ alkyl radical. Preferred alkylene imines useful in this invention are ethylenimine and propylenimine. For the imination reaction to be effective, the resulting iminated polymer should have a nitrogen content of about 0.05–1% by weight.

One preferred acrylic dispersion is formed from a blend of two acrylic polymers. The blend consists of 25–35% by weight of a methyl methacrylate/ethyl acrylate polymer and 75–65% by weight of a methyl methacrylate/ethyl acrylate/methacrylic acid polymer that has been reacted with sufficient propylenimine to provide the polymer with about 0.01–0.5% by weight nitrogen.

Also, to increase the scuff and abrasion resistance of the novel coriaceous synthetic microporous sheet material of this invention, polyvinyl butyral is added to the finish composition of the elastomeric polymer in amounts up to 50% by weight of total polymer solids of the finish and preferably, 10–25% by weight of total polymer solids. One preferred coating composition contains 78 parts by weight of an elastomeric polyurethane polymer, 22 parts by weight polyvinyl butyral polymer and 133 parts by weight pigment.

Another method to increase abrasion and scuff resistance, is to add a silicone resin to the elastomeric polymer finish used to form the novel coriaceous microporous sheet material of this invention. About 0.1–10% by weight, and preferably, 1–5% by weight, of total polymer solids, of the silicone resin is added to the finish composition. One preferred silicone resin is dimethyl polysiloxane that has a viscosity of over 1000 centipoises; for example, Dow Corning Silicone C–4–2009, which is a dimethyl polysiloxane and has a viscosity of about 1200 centipoises, and Dow Corning DC–200 silicone fluid, which has a viscosity of about 100,000 centipoises.

Any of the well known pigments, extender pigments and dyes can be added to the elastomeric polymer finish used to form the novel microporous sheet material of this invention to give the desired color to the product. About 10–50% by volume pigment and preferably, 15–25% by volume pigment, can be used. Typically useful pigments are, for example, metal oxides, such as titanium dioxide, metal hydroxides, chromates, silicates, sulfides, sulfates, carbonates, carbon blacks, organic dyes, such as β-copper phthalocyanine, lakes and metal flake pigments.

Antioxidants are generally added in small amounts to the elastomeric polymer finish used to form the novel microporous sheet material of this invention, such as 4,4' - butylidene-bis - (6 - tertiary-butyl-m-cresol), 2,2'-methylene-bis-(4-methylene-6-tertiary-butylphenol).

If the finish is applied from a solution, the primary requirement for the solvent used for the finish composition is that it does not attack and degrade the microporous polymer of the sheet material, thereby causing complete collapse of the microporous structure or substantially reducing the water vapor permeability of the foundation material. Therefore, the solvent must selectively dissolve the polymer used for the finish but must be substantially inert to the microporous foundation material.

The preferred foundation material of the novel vapor permeable coriaceous synthetic microporous product of this invention comprises a porous substrate of a synthetic polymeric material reinforced with fibers and having in firm adherence thereto a microporous synthetic polymeric coating. Polymers that are useful for forming the foundation material of this invention have a secant tensile modulus at 5% elongation of above about 600 pounds per square inch (p.s.i.) during the entire processing cycle of making the foundation material, i.e., from the time the polymer is coagulated into a microporous structure until it is dried. If the microporous structure of the foundation material is formed from polymers which in consolidated form have a secant tensile modulus below about 600 p.s.i., the microporous structure collapses as the liquid is being removed or after the liquid is removed from the micropores of the structure so that a relatively impermeable product is formed. Preferably, the secant tensile modulus during the cycle of forming the foundation material is about 600–25,000 p.s.i., and more preferably, about 800–10,000 p.s.i., and still more preferably, about 800–3000 p.s.i. The secant tensile modulus is the ratio of the stress to the strain at 5% elongation of the specimen determined from the tensile stress-strain curve and is expressed as force per unit area, e.g., pounds per square inch. The secant tensile modulus measurement is carried out according to ASTM–D–882–64–T modified as described below.

The secant tensile modulus of the polymer useful for forming the foundation material of this invention is determined by forming a 5 to 20 mil continuous void-free polymer film from the polymeric solution used in the process to form the microporous sheet material of this invention. The film is formed by casting this polymer solution on a glass plate and the solution is then dried, e.g., at 105° for 90 minutes.

The stress-strain curve which is necessary to calculate the secant tensile modulus of the polymer used in this invention to form the microporous foundation material is preferably obtained on an Instron Tensile Tester using a ½ inch wide specimen cut from the above prepared polymeric film with about one inch between grips. The following settings are preferably used on the Instron Tester to obtain a stress-strain curve: chart speed of 10 inches per minute, cross head speed of 1 inch per minute, and a full scale load of 2 to 5 pounds.

The secant tensile modulus is obtained from the chart of the force vs. strain curve by drawing a line at 5% elongation (strain) parallel to the force axis of the chart. The point at which this line intersects the force/strain curve defines the force in pounds necessary to elongate the specimen 5%. This force value is divided by the initial cross-sectional area of the specimen to give the corresponding stress value in pounds per square inch. This stress value is divided by the strain (0.05) to give the secant tensile modulus.

To initially select polymers useful in this invention, for forming the microporous foundation material, the test temperature is usually room temperature, about 23° C. At this temperature, polymers potentially useful in this invention have a secant tensile modulus at 5% elongation above about 600 p.s.i. However, as previously stated, polymers useful in this invention have a secant tensile modulus at 5% elongation of above about 600 p.s.i. during the entire process cycle; therefore, the highest temperature used during the process for forming the microporous foundation material should be used as the test temperature, e.g., if the drying temperature is 120° C., the secant tensile modulus of a potentially useful polymer should be tested at 120° C. and at this test temperature, the secant tensile modulus at 5% elongation should be above about 600 p.s.i.

Preferably, the microporous foundation material of this invention utilizes a polyurethane polymer. One process for making a microporous foundation material from polyurethane polymer is disclosed in U.S. Patent 3,100,721, to E. K. Holden, issued Aug. 13, 1963. Polymers useful in forming the microporous foundation material have a secant tensile modulus of above about 600 p.s.i. and are polyurethanes either alone or in a mixture with other polymers, such as a vinyl chloride polymer. One class of polyurethanes useful in this invention for forming the foundation material are polyureas, that is, polyurethanes containing the recurring structural unit:

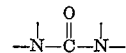

The prepolymers for the polyurethanes are prepared by mixing one or more polyalkyleneether glycols or hydroxyl-terminated polyesters with a molar excess of organic diisocyanate and heating the mixture to a temperature of about 50–100° C. to form a prepolymer having terminal —NCO groups. An alternate procedure is to react the diisocyanate with a molar excess of polyalkyleneether glycol or polyester, then cap the resulting product, that is, react it with more diisocyanate to form a prepolymer having terminal —NCO groups.

The preferred polyurethanes used for making the foundation material utilized in this invention are the chain-extended polyurea type which are formed from aliphatic polyol segments which include the polyalkyleneether glycols having $C_3$–$C_{12}$ alkylene segments and the hydroxyl-terminated polyester of $C_3$–$C_{12}$ acyclic dicarboxylic acid and $C_3$–$C_{12}$ alkylene glycol. Polyalkyleneether glycols are the preferred active hydrogen containing material for the prepolymer formation. The most useful polyglycols have a molecular weight of 300 to 5000, preferably 400 to 2000; some of these polyglycols are, for example, polyethyleneether glycol, polypropyleneether glycol, polytetramethyleneether glycol, polyhexamethyleneether glycol, polydecamethyleneether glycol, polydodecamethyleneether glycol, and mixtures thereof. Polyglycols containing several different radicals in the molecular chain such as the compound $HO(CH_2OC_2H_4O)_nH$ wherein $n$ is an integer greater than 1 can also be used.

The preferred polyurethanes used for making the foundation material utilized in this invention are prepared with at least a major portion of an aromatic, aliphatic or cycloaliphatic diisocyanate, or mixtures thereof; for example, tolylene-2,4-diisocyanate, tolylene-2,6-diisocyanate, m-phenylene diisocyanate, biphenylene-4,4'-diisocyanate, methylene-bis-(4-phenyl isocyanate), 4-chloro-1,3-phenylene/diisocyanate, naphthalene-1,5-diisocyanate, tetramethylene-1,4-diisocyanate, hexamethylene-1,6-diisocyanate, decamethylene-1,10-diisocyanate, cyclohexylene-1,4-diisocyanate, methylene bis-(4-cyclohexyl isocyanate) and tetrahydronaphthalene diisocyanate.

Polyesters can be used to form the polyurethane polymer of the foundation material utilized in this invention instead of or in conjunction with the polyalkyleneether glycols, particularly those polyesters formed by reacting acids, esters or acid halides with glycols. Suitable glycols are alkylene glycols, such as methylene-, ethylene-, propylene-, tetramethylene-, decamethylene glycol; substituted alkylene glycols, such as 2,2-dimethyl-1,3-propanediol; cyclic glycols, such as cyclohexanediol and aromatic glycols, such as xylylene glycol. Aliphatic glycols are generally preferred when maximum product flexibility is desired and when making microporous articles. These glycols are reacted with aliphatic, cycloaliphatic or aromatic dicarboxylic acids or lower alkyl esters or ester forming derivatives to produce relatively low molecular weight polymers, preferably having a melting point of less than about 70° C., and molecular weights like those indicated for the polyalkyleneether glycols. Acids for preparing such polyesters are succinic, adipic, suberic, sebacic, terephthalic and hexahydroterephthalic acids and the alkyl and halogen substituted derivatives of the acids.

Hydrazine is preferred as the chain-extending agent for the preferred polyurethanes used to make the foundation material utilized in this invention, although $C_1$-$C_6$ (including cycloaliphatic) diamines, such as ethylene diamine, hexamethylene diamine and dimethyl piperazine and 1,4-diamino/piperazine can also be used advantageously either alone or in a mixture with hydrazine.

A particularly preferred chain-extender which is reacted with the isocyanates terminated prepolymer has the structural formula

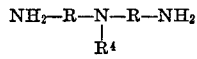

wherein R is

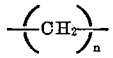

and $n$ is from 1–4, and $R^4$ is an alkyl group of 1–4 carbon atoms. The preferred compound is N-methyl-aminobispropylamine. It is usually best to use a blend of a minor proportion, preferably about 5–30 mole percent, of the above preferred chain-extender with a major proportion, about 95–70 mole percent, of another compound having two amino nitrogen atoms, each nitrogen having an active hydrogen atom bonded thereto, preferably hydrazine. Other chain-extending compounds which can be used along with the preferred compound are monosubstituted hydrazines, dimethyl piperazine, 4-methyl-m-phenylene-diamine, m-phenylene-diamine, 4,4'-diaminodiphenylmethane, 1,4-diamino-piperazine, ethylene diamine and mixtures thereof.

Mixture of at least one vinyl polymer with a polyurethane can be used to prepare the microporous foundation material. Such mixtures, preferably containing polyvinyl chloride as the vinyl polymer, can contain from 1 to 2% of vinyl chloride polymer to about 50% thereof.

Preferably, the novel coriaceous synthetic microporous sheet material is used as a leather replacement, therefore, the foundation material is preferably fiber reinforced to give the rigidity and strength required for this use. The porous substrate of the foundation material is a fibrous substrate impregnated with a polymeric material. Such fibrous substrates are, for example, wovens, such as twills, drills, and ducks; knitted materials, such as jersey and tricot, felts, needle punched batts. The choice of the particular fibers from which the substrate is made is not critical; they include those made from polyamides, polyesters, polyesteramides, acrylic polymers, viscose rayon, wool, cotton, glass and mixtures thereof. Elastomeric fibers and elastic fibers can be also used. Porous nonwoven, needle punched, heat shrunk batts of polyethylene terephthalate fibers impregnated with a polyurethane are particularly preferred. The preferred sheet material contains about 30–60% fiber by weight and about 70–40% of a microporous polyurethane polymer.

Another foundation material that can be used to form the novel vapor permeable microporous product of this invention is formed from fibrids. Bundy U.S. Patent 3,100,733, issued Aug. 13, 1963, which is hereby incorporated by reference, fully discloses one process for making a foundation material useful in this invention with fibrids.

The examples which follow illustrate the invention. All quantities are on a weight basis unless otherwise indicated.

EXAMPLE 1

A poly(ether/urethane) polymer A is prepared according to the procedure described in Katz U.S. Patent 2,929,802, issued Mar. 27, 1960, by reacting 1.0 mole of the bis-chloroformate of polytetramethyleneether glycol molecular weight 1750, 4.0 moles of the bis-chloroformate of 1,4-butane diol with 4.2 moles piperazine. After the polymer is formed, a small amount of a stabilizer of 4,4'-butylidene bis-(6-tertiary-butyl-m-cresol) is added.

The physical properties of polymer A are determined by casting a film from a 5% polymer solids solution in which the solvent is a mixture of chloroform. The solvent is evaporated and the film is baked at 100° C. for ½ hour. The physical properties are then determined for the polymer from the above prepared film with the following results:

Permeability constant for water vapor _____ 11,000
Stress at 100% elongation _____p.s.i__ 640
Tensile strength _____p.s.i__ 4,700
Permanent set _____percent__ 6

Primer finish composition 1 is formed by blending the following ingredients:

| | Parts by wt. |
|---|---|
| Polyurethane polymer solution—(5% solids of poly(ether/urethane) polymer A dissolved in a solvent mixture of 50:40:10 of isopropanol/ toluene/water) _____ | 87.5 |
| Pigment dispersion—(60 parts by weight titanium dioxide pigment dispersed with 10 parts by weight of polyvinyl butyral molecular weight about 38,000–45,000 in 30 parts by weight ethanol) __ | 12.5 |
| Total _____ | 100.0 |

A roll of microporous polyurethane foundation material about 42 inches wide is made in accordance with the teachings in Example 1 of U.S. patent application Ser. No. 355,436, to Bateman, filed Mar. 27, 1964, now abandoned. The resulting product is a porous impregnated non-woven web about 50 mils thick of 0.5 denier heat shrunk polyethylene terephthalate fibers impregnated with a microporous polyurethane polymer having an interlayer fabric and that is uniformly coated on one side with about 10 mils of a microporous polyurethane polymer. The foundation material has a water vapor permeability of 8000 grams/hour/100 m².

The above prepared microporous polyurethane foundation material is dip coated with primer finish composition 1 and the coated sheet is dried at about 100° C. The resulting sheet has about 1.5 oz./square yard of dried finish.

An acrylic finish is formulated as follows.

| | Parts by wt. |
|---|---:|
| Aqueous acrylic polymer dispersion—(50% by weight polymer solids, the polymeric constituent is a blend of the following two polymers: | |
| (1) 70% by weight of a polymer of methyl methacrylate/ethyl acrylate/methacrylic acid, weight ratio 38/57/4, in which about 50% of the carboxyl groups have been reacted with propylenimine; | |
| (2) 30% by weight of a polymer of methyl methacrylate/ethyl acrylate, weight ratio 35/65). | 12.5 |
| Titanium dioxide pigment dispersion-containing 72% titanium dioxide pigment | 12.5 |
| Water | 75.0 |
| Total | 100.0 |

The above acrylic polymer dispersion is dip coated on the above prepared polyurethane finished microporous sheet and dried at 100° C. to give a dried acrylic finish of about 0.15 oz./square yard. A clear final coat of cellulose acetate butyrate coat is applied having a dry weight of about 0.05 oz./square yard. The sheet material is then embossed according to the process described in U.S. Patent 3,157,723 to J. Hochberg, issued Nov. 17, 1964, with about 10 p.s.i. pressure and at a temperature of about 150° C. This embossing process gives the sheet material an excellent leather-like appearance.

This finished microporous polyurethane sheet material is subjected to the following tests and the results of the tests are recorded in Table I.

Bally flexometer test

The Bally flexometer provides a rolling, folding type of action in which a metal finger pushes into the sample from the back while the sample is rocked up and down. The samples are inspected after 40,000 flexes. Appearance of cracks in the finish and also failure of actual finish by flaking, generally around the area where the metal finger is pushed into the material, is recorded.

Water vapor permeability determinations

Permeability of the above prepared finished microporous polyurethane sheet material is determined by sealing the sheet on the top of a cup containing $CaCl_2$ and by determining the wight increase of $CaCl_2$ due to moisture pickup in the cup. The cup is stored at 90% R.H. in a constant temperature room at 72° F. for a two-hour period. The water vapor permeability of the sheet is then calculated in grams of water per hour per 100 square meters of material.

Cold cracking test

The above prepared finished sheet material is subjected to −20° C. temperature and while the sheet is at this temperature, the sheet is folded 180 degrees with the finished surfaces being the outer side of the sheet after it is folded. The sheet is then returned to a straight or flat position and the finish examined for microcracks and breaks. This test applies a severe tensile stress to the finish while it is at a low temperature.

EDGEWEAR TESTS

Wet abrasion test

This test abrades the surface of the finished microporous polyurethane sheet material while in a wet condition. Prior to testing, the samples are soaked in water for one hour. A sample is fastened onto a half-round cylinder having a diameter of about two inches and weighing approximately four pounds. The cylinder is pushed back and forth across a Wellington-Sears No. 10 duck cloth. Under these conditions, the sample is subjected to about a two pound load per linear inch. After fifty strokes, the samples are examined for abrasion of the surface of the finish.

Dry abrasion test

Same as the wet abrasion test, except the sample is not soaked in water before testing.

In general, the aforementioned tests illustrate that the above prepared finished microporous polyurethane sheet material has excellent flex, crack and abrasion resistance even under severe test conditions, such as, a low temperature of −20° C., which is required of a material used for shoe uppers.

EXAMPLE 2

A poly(ether/urea/urethane) polymer B is prepared by reacting the following ingredients:

| | Parts by wt. |
|---|---:|
| Poly(tetramethyleneether) glycol molecular weight about 2100 | 210.00 |
| 4,4′-Methylene - bis - (cyclohexyl isocyanate) (containing 20% trans, trans isomer( | 48.8 |
| Toluene | 250.00 |
| Dibutyltin dilaurate | 0.30 |
| Total | 509.10 |

The poly(tetramethyleneether) glycol is dried at 100° C. for 30 minutes under about 0.02 mm. of vacuum. This dried product is then mixed with the 4,4′-methylene bis-(cyclohexyl isocyanate), toluene and the dibutylin dilaurate catalyst. This solution while being continuously agitated is heated to 100° C. and held at this temperature for about 1 hour. The resulting prepolymer solution is a clear liquid having about 52% by weight isocyanate-terminated prepolymer content. The isocyanate content of the solution is about 0.319 milliequivalent of isocyanate per gram of solution.

About 400 parts by weight of the above prepared prepolymer solution (127.8 milliequivalents of isocyanate) are slowly added over a 1-hour period to a solution of 5.5 parts by weight anhydrous piperazine (127.8 milliequivalents of NH), 1552 parts by weight isobutyl alcohol and 250 parts by weight toluene. During this 1-hour period, the solution is continuously agitated, and then 222 parts of water are added and blended with the polymer solution.

The physical properties of the polymer are determined as in Example 1 with the following results:

| | |
|---|---:|
| Permeability constant for water vapor | 10,400 |
| Stress at 100% elongation _____p.s.i__ | 590 |
| Permananent set _____percent__ | 2 |
| Tensile strength _____p.s.i__ | 5,500 |

Finish composition 2 is formulated by blending the following ingredients:

| | Parts by wt. |
|---|---:|
| Poly(ether/urea/urethane) polymer B solution— (8.8% polymer solids of the above prepared polymer B dissolved in 70/20/10 mixture of isobutanol/toluene/water) | 34.2 |
| Pigment dispersion—(60 parts by weight titanium dioxide pigment (rutile) dispersed with 10 parts by weight polyvinyl butyral molecular weight about 38,000–45,000 in 30 parts by weight ethanol) | 8.5 |
| Diacetone alcohol | 22.9 |
| Toluene | 17.2 |
| Isopropanol | 17.2 |
| Total | 100.0 |

This finish composition 2 is dip coated on the microporous polyurethane foundation material of Example 1 and dried at about 100° C. About 1.5 oz./square yard of dried finish are applied. The base acrylic coat described in Example 1 is applied over the above dried finish using the same procedure as in Example 1 giving a dry acrylic base finish layer of about 0.15 oz./square yard. A clear final coat of cellulose acetate butyrate is applied as in Example 1 and the finished sheet material is then embossed using the same procedure as in Example 1. The resulting sheet material has an excellent leather-like appearance.

This embossed sheet material is subjected to the identical physical tests of Example 1 and the results of these tests are recorded in Table I.

EXAMPLE 3

A poly(ether/urethane) polymer C is prepared by reacting the following ingredients:

| | Parts by wt. |
|---|---|
| Poly(tetramethyleneether) glycol molecular weight about 2100 | 105.00 |
| 4,4'-Methylene bis-(cyclohexyl isocyanate) (50% trans, trans isomer) | 26.70 |
| Dibutyltin dilaurate | 0.22 |
| Total | 131.92 |

The poly(tetramethyleneether) glycol is dried as in Example 2 and then mixed with the 4,4'-methylene bis-(cyclohexyl isocyanate), and the catalyst of dibutyltin dilaurate. This solution while being agitated is held at 100° C. for about 30 minutes. The resulting prepolymer solution is a clear viscous liquid. About 4.23 parts by weight of 1,4-butane diol and 554 parts by weight toluene are added to the prepolymer solution and this mixture is heated and held at 100° C. for about two hours.

After this two-hour period, about 0.13 part by weight of water are added during a ten-minute interval to the above polymer solution which is being held at 100° C. and continuously stirred. This addition of water is repeated until a total of 0.78 part by weight water are added to the polymer solution. A mixture of 500 parts by weight isopropanol and 60 parts by weight water are added while the polymer solution is held at 100° C. and agitated. The resulting polymer solution has a polymer solids content of 11% and when cooled to room temperature is a cloudy viscous liquid.

The physical properties of the ploymer are determined as in Example 1 with the following results:

| | | |
|---|---|---|
| Permeability constant for water vapor | | 11,200 |
| Permanent set | percent | 1 |
| Tensile strength | p.s.i | 5,300 |
| Stress at 100% elongation | p.s.i | 325 |

Finish composition 3 is formulated by blending the following ingredients:

| | Parts by Wt. |
|---|---|
| Poly(ether/urethane) polymer C solution—(10.9% polymer solids of the above prepared polymer B dissolved in a 50:50 solvent mixture of isopropanol/toluene) | 30.0 |
| Pigment dispersion (described in Example 2) | 8.5 |
| Solvent (50/40/10 mixture of isopropanol/toluene/water) | 61.5 |
| Total | 100.0 |

This finish composition 3 is dip coated on the microporous polyurethane foundation material described in Example 1 and dried at about 100° C. About 1.5 oz./square yard of dried finish are applied. A base acrylic coat described in Example 1 is applied over the dried finish using the same procedure as in Example 1 giving a dry acrylic base finish layer of about 0.15 oz./square yard. A clear final coat of cellulose acetate butyrate is applied as in Example 1 and the finished sheet material is then embossed using the same procedure as in Example 1. The resulting sheet material has an excellent leather1like appearance.

This embossed sheet material is subjected to the identical physical tests of Example 1 and the results of these tests are recorded in Table I.

EXAMPLE 4

A poly(ether/urea/urethane) polymer D is prepared by reacting the following ingredients:

| | Parts by Wt. |
|---|---|
| Poly(tetramethyleneether) glycol molecular weight 2060 | 281.00 |
| Hexamethylene diisocyanate | 45.90 |
| Toluene | 273.00 |
| Dibutyltin dilaurate | 0.27 |
| Total | 600.17 |

The poly(tetramethyleneether) glycol is dried as in Example 2 and then mixed with the hexamethylene diisocyanate, toluene and the dibutyltin dilaurate. This solution, while being constantly agitated, is held at 100° C. for about 30 minutes. The resulting prepolymer solution is a clear viscous liquid having a polymer solids content of 54.5% and contains 0.437 milliequivalent of isocyanate per gram of solution.

About 524 parts of the above prepared prepolymer solution are slowly added over a 1-hour period to a solution of 9.85 parts by weight anhydrous piperazine, 1300 parts by weight isopropyl alcohol and 1060 parts by weight toluene. During this 1-hour period, the solution is continuously agitated.

The resulting polymer solution has a viscosity of 38 poises and remained stable for several weeks.

The physical properties of the polymer are determined as in Example 1 with the following results:

| | | |
|---|---|---|
| Permeability constant for water vapor | | 16,300 |
| Stress at 100% elongation | p.s.i | 280 |
| Permanent set | percent | 2 |
| Tensile strength | p.s.i | 7,800 |

Finish composition 4 is formulated by blending the following ingredients:

| | Parts by Wt. |
|---|---|
| Poly(ether/urea/urethane) polymer D solution— (10.2% polymer solids solution of the above prepared polymer D dissolved in a 50/50 mixture of isopropyl alcohol/toluene) | 29.5 |
| Pigment dispersion (described in Example 2) | 8.5 |
| Diacetone alcohol | 27.6 |
| Toluene | 17.2 |
| Isopropanol | 17.2 |
| Total | 100.0 |

This finish composition 4 is dip coated on the microporous foundation material of Example 1 and dried at about 100° C. About 1.5 oz./square yard of dried finish are applied. The base acrylic coated described in Example 1 is applied over the dried finish using the same procedure as in Example 1 giving a dry acrylic base finish layer of about 0.15 oz./square yard. A celar final coat of cellulose acetate butyrate is applied as in Example 1 and the finished sheet material is then embossed using the same procedure as in Example 1. The resulting sheet material has an excellent leather-like appearance.

This embossed sheet material is subjected to the identical tests of Example 1 and the results of these tests are recorded in Table I.

EXAMPLE 5

A poly(ether/urea/urethane) polymer E is prepared by reacting the following ingredients:

| | |
|---|---|
| Poly(propyleneether) glycol molecular weight 1000 | 100.00 |
| Hexamethylene diisocyanate | 33.64 |
| Benzene | 100.00 |
| Dibutyltin dilaurate | 0.20 |
| Total | 233.84 |

The poly(propyleneether) glycol is dried as in Example 2 and then mixed with the hexamethylene diisocyanate, benzene and dibutyltin dilaurate. This solution is held at 100° C. for 2 hours while being constantly agitated. The resulting prepolymer solution is a clear viscous liquid having a polymer solids of 57.1% by weight and 0.836 milliequivalent of isocyanate per gram of solution.

About 195.9 parts by weight of the above prepared prepolymer solution are slowly added over a 1-hour period to a solution of 7 parts by weight anhydrous piperazine, 232 parts by weight methyl alcohol and 151 parts by weight benzene. During this period, the solution is continuously agitated.

The resulting polymer solution has a polymer solids content of 19.4% by weight.

The physical properties of the polymer are determined as in Example 1 with the following results:

Permeability constant for water vapor _____ 11,000
Stress at 100% elongation _____p.s.i__ 320
Permanent set _____percent__ 3
Tensile strength _____p.s.i__ 2,300

Finish composition 5 is formulated by blending the following ingredients:

Parts by wt.
Poly(ether/urea/urethane) polymer E solution—
 (10% polymer solids solution of the above prepared polymer E dissolved in a solvent of 50/50
 isopropanol/toluene) _____ 30.0
Pigments dispersion (described in Example 2) ___ 8.5
Diacetone alcohol _____ 27.1
Toluene _____ 17.2
Isopropanol _____ 17.2
                                              _____
        Total _____ 100.0

This finish composition 5 is dip coated on the microporous foundation material of Example 1 and dried at about 100° C. About 1.5 oz./square yard of dried finish are applied. The base acrylic coat described in Example 1 is applied over a dried finish using the same procedure as in Example 1 giving a dry acrylic base finish layer of about 0.15 oz./square yard. A clear final coat of cellulose acetate butyrate is applied as in Example 1 and the finished sheet material is then embossed using the same procedure as in Example 1. The resulting sheet material has an excellent leather-like appearance.

This embossed sheet material when subjected to the physical tests described in Example 1 gave excellent results similar to those of the sheet materials of Examples 1 through 4.

EXAMPLE 6

A poly(ester/urea/urethane) polymer F is prepared by reacting the following ingredients:

Parts by wt.
Poly(epsilon-caprolactone) hydroxyl terminated
 molecular weight 2080 _____ 104.00
4,4'-methylene-bis-(cyclohexyl isocyanate) (20%
 trans-trans isomer) _____ 22.95
Toluene _____ 125.00
Dibutyltin dilaurate _____ 0.15
                                              _____
        Total _____ 252.10

The poly(epsilon-caprolactone) glycol is dried as in Example 2 and then mixed with the 4,4'-methylene bis-(cyclohexyl isocyanate), toluene and dibutyltin dilaurate. This solution is held at 100° C. for 1 hour while being constantly agitated. The resulting prepolymer solution is a clear viscous liquid having a prepolymer solids content of 50.3% by weight and 0.27 milliequivalent of isocyanate per gram of solution.

About 200 parts of the above prepared prepolymer solution are slowly added over a 1-hour period to a solution of 2.33 parts by weight anhydrous piperazine, 466 parts by weight isopropyl alcohol and 369 parts by weight toluene. During this period, the solution is continuously agitated.

The resulting polymer solution has a polymer solids content of 10.1% by weight and a viscosity of 2 poises.

The physical properties of the polymer are determined as in Example 1 with the following results:

Permeability constant for water vapor _____ 7,400
Stress at 100% elongation _____p.s.i__ 470
Permanent set _____percent__ 3
Tensile strength _____p.s.i__ 5,000

Finish composition 6 is formulated by blending the following ingredients:

Parts by wt.
Poly(ether/urea/urethane) polymer F solution—
 (10% polymer solids solution of the above prepared polymer F dissolved in a solvent of 50/50
 toluene/isopropanol) _____ 30.0
Pigment dispersion (described in Example 2) ____ 8.5
Diacetone alcohol _____ 27.1
Toluene _____ 17.2
Isopropanol _____ 17.2
                                              _____
        Total _____ 100.0

This finish composition 6 is dip coated on the microporous foundation material of Example 1 and dried at about 100° C. About 1.5 oz./square yard of dried finish are applied. The base acrylic coat described in Example 1 is applied over the dried finish using the same procedure as in Example 1 giving a dry acrylic base finish layer of about 0.15 oz./square yard. A clear final coat of cellulose acetate butyrate is applied as in Example 1 and the finished sheet material is then embossed using the same procedure as in Example 1. The resulting sheet material has an excellent leather-like appearance.

This embossed sheet material when subjected to the physical tests described in Example 1 gave excellent results similar to those of the sheet materials of Examples 1 through 4.

EXAMPLE 7

A poly(ether/urea/urethane) polymer G is prepared by reacting the following ingredients:

Parts by wt.
Poly(tetramethyleneether) glycol molecular wt.
 2100 _____ 208.00
Hexamethylene diisocyanate _____ 33.64
Benzene _____ 230.00
Dibutyltin dilaurate _____ 0.28
                                              _____
        Total _____ 471.92

The poly(tetramethyleneether) glycol is dried as in Example 2 and then mixed with the hexamethylene diisocyanate, toluene and dibutyltin dilaurate. This solution is held at 100° C. for 1 hour while being constantly agitated. The resulting prepolymer solution is a clear viscous liquid having a polymer solids of 51.2% by weight and 0.396 milliequivalent of isocyanate per gram of solution.

About 102.2 parts of the above prepared prepolymer solution are slowly added over a 1-hour period to a solution of 4.23 parts by weight anhydrous 1,3-bis-(4-piperidyl)-propane, 238 parts by weight methyl alcohol and 120 parts by weight benzene. During this period, the solution is continuously agitated.

The resulting polymer solution has a polymer solids content of 12.2% by weight.

The physical properties of the polymer are determined as in Example 1 with the following results:

Permeability constant for water vapor _____ 13,700
Stress at 100% elongation _____p.s.i__ 126
Permanent set _____percent__ 3
Tensile strength _____p.s.i__ 1,100

Finish composition 7 is formulated by blending the following ingredients:

| | Parts by wt. |
|---|---|
| Poly(ether/urea/urethane) polymer G solution— (10% polymer solids solution of the above prepared polymer G dissolved in a solvent of 50/50 toluene/isopropanol) | 30.0 |
| Pigment dispersion (described in Example 2) | 8.5 |
| Diacetone alcohol | 27.1 |
| Toluene | 17.2 |
| Isopropanol | 17.2 |
| Total | 100.0 |

This finish composition 7 is dip coated on the microporous foundation material of Example 1 and dried at about 100° C. About 1.5 oz./square yard of dried finish are applied. The base acrylic coat described in Example 1 is applied over the dried finish using the same procedure as in Example 1 giving a dry acrylic base finish layer of about 0.15 oz./square yard. A clear final coat of cellulose acetate butyrate is applied as in Example 1 and the finished sheet material is then embossed using the same procedure as in Example 1. The resulting sheet material has an excellent leather-like appearance.

This embossed sheet material when subjected to the physical tests described in Example 1 gave excellent results similar to those of the sheet materials of Examples 1 through 4.

EXAMPLE 8

Poly(ether/ester) polymer H is formed by reacting the following ingredients:

| | Parts by wt. |
|---|---|
| Poly(tetramethyleneether) glycol — molecular weight about 2070 | 103.5 |
| Dimethyl terephthalate | 29.1 |
| 1,4-butane diol | 9.5 |
| Tetraisopropyl orthotitanate | 0.8 |
| Total | 142.9 |

The above ingredients are mixed together and rapidly heated under nitrogen to 150° C. while being agitated, and then the temperature of the mixture is slowly raised during a 1-hour period to 200° C. The mixture is stirred and held at 200° C. for 2 hours and methanol is removed as it is being distilled from the melt. Heating at 200° C. is continued for 4 hours and a vacuum of (0.1 mm. Hg) is applied.

The resulting polymer solution H is a clear viscous liquid.

The physical properties of polymer H are determined as in Example 1:

| | |
|---|---|
| Permeability constant for water vapor | 13,000 |
| Permanent set percent | 10 |
| Stress at 100% elongation p.s.i | 280 |
| Tensile strength p.s.i | 750 |

Finish composition 8 is prepared by blending the following ingredients:

| | Parts by wt. |
|---|---|
| Polymer solution—(10% polymer H dissolved in methylene chloride) | 60 |
| White pigment dispersion (formed by blending 80 parts by weight titanium dioxide pigment and 50 parts by weight of polymer H on a cold 2 mill roll for about ½ hour) | 10 |
| Methylene chloride | 30 |
| Total | 100 |

This finish composition 8 is dip coated on the microporous foundation material of Example 1 and dried at about 100° C. About 1.5 oz./square yard of dried finish are applied. The base acrylic coat described in Example 1 is applied over the dried finish using the same procedure as in Example 1 giving a dry acrylic base finish layer of about 0.15 oz./square yard. A clear final coat of cellulose acetate butyrate is applied as in Example 1 and the finished sheet material is then embossed using the same procedure as in Example 1. The resulting sheet material has an excellent leather-like appearance.

This embossed sheet material when subject to the physical tests described in Example 1 gave excellent results similar to those of the sheet material of Examples 1 through 4.

EXAMPLE 9

Poly(ester/ester) polymer I can be prepared by reacting about 104 parts by weight of a hydroxyl terminated poly(epsilon-caprolactone) having a molecular weight of about 2080 and about 29 parts by weight of dimethyl terephthalate, about 10 parts by weight 1,4-butane diol and about 1 part by weight tetraisopropyl orthotitanate. The procedure used in Example 8 to form the poly(ether/ester) polymer H can be used to form the above polymer I.

The resulting polymer should have a permeability constant for water vapor over 3000, a stress at 100% elongation between 50–4000 p.s.i., a permanent set of less than 20% and a tensile strength of at least 30 p.s.i.

Polymer I can be formulated into a pigmented finish by using the same procedure as in Example 8: This finish, prepared by polymer I, can be applied to the microporous foundation material described in Example 1, along with an acrylic base coat and cellulose acetate butyrate final coat and embossed as in Example 1. The resulting sheet material will have a leather-like appearance, and has flex, scuff and abrasion resistance similar to the material prepared in Examples 1–4.

EXAMPLE 10

Poly(ether/carbonate) polymer J can be prepared by blending about 65 parts by weight of poly(tetramethylene ether) glycol having a molecular weight af about 4100, 35 parts by weight 4,4'-isopropylidene diphenol, 350 parts by weight methylene chloride and 61 parts by weight pyridine. The above mixture is heated while being rapidly agitated to about 20–30° C. in a water bath and a solution containing 10% by weight phosgene in 1,2-dichloroethane is slowly added to the mixture. A small amount of water is then added to the polymer solution and the solution is then further diluted with methylene chloride. The polymer solution is then washed with dilute hydrochloric acid to remove pyridine hydrochloride.

The resulting polymer should have a permeability constant for water vapor over 3000, a stress at 100% elongation between 50–4000 p.s.i. a permanent set of less than 20% and a tensile strength of at least 300 p.s.i.

Polymer J can be formulated into a pigmented finish by using the same procedure as in Example 8. This finish prepared with polymer J can be applied to the microporous foundation material described in Example 1, along with an acrylic base coat and cellulose acetate butyrate final coat and embossed as in Example 1. The resulting sheet material will have a leather-like appearance and excellent flex scuff and abrasion resistance.

EXAMPLE 11

Poly(siloxane/siloxane) polymer K can be prepared by blending about 50 parts by weight hydroxyl-terminated poly(dimethylsiloxane) having an average degree of polymerization of 18, 50 parts by weight p-bis-(dimethylhydroxysilyl) benzene, 0.5 part by weight tetramethyl guanidine di-2-ethylhexoate and 50 parts by weight benzene. This mixture is agitated and heated for about 6½ hours at reflux and water is removed from the benzene as it is refluxed in an azeotrope trap. The polymer solution is then diluted with benzene to give a solution having about a 10% polymer solids content.

The resulting polymer should have a permeability constant for water vapor over 3000, a stress at 100% elongation between 50–4000 p.s.i. a permanent set of less than 20% and a tensile strength of at least 300 p.s.i.

Polymer K can be formulated into a pigmented finish by using the same procedure as in Example 8. This finish prepared with polymer K can be applied to the microporous foundation material described in Example 1, along with an acrylic base coat and cellulose acetate butyrate final coat and embossed as in Example 1. The resulting sheet material will have a leather-like appearance and excellent flex, scuff and abrasion resistance.

TABLE I.—EVALUATION OF CORIACEOUS MICROPOROUS SHEET MATERIAL

| Microporous Polyurethane Sheet Material of | Bally Flex (40,000 Flexes) | Cold Cracking −20° C. | Water Vapor Permeability, gm./hr./ 100 m.² | Edgewear | |
|---|---|---|---|---|---|
| | | | | Wet | Dry |
| Example 1 | 1 | 0 | 2,500 | 0 | 1 |
| Example 2 | 1 | 0 | 3,000 | 0 | 0 |
| Example 3 | 2 | 0 | 2,550 | 1 | 2 |
| Example 4 | 1 | 0 | 3,000 | 0 | 2 |

Rating System—
 0 No cracks or abrasion.
 1 Microcracks or some visual abrasion.
 2 Some visual cracks plus microcracks or deep abrasion without finish or coating failure.
 3 Severe visual cracks or complete failure of finish.

We claim:
1. A vapor permeable coriaceous synthetic microporous sheet material comprising
  (1) a porous substrate of a synthetic polymeric material reinforced with fibers having adhered thereto a microporous synthetic polymer coating (A), and
  (2) about 0.1–5 mils of non-porous vapor permeable finish (B) in superimposed adherence with said microporous coating (A) and comprises an elastomeric polymer containing
    (a) at least 40% by weight of soft polymeric segments from a polymer that has a glass transition temperature below −20° C. and contains about 10–50% by weight of an element selected from the group consisting of oxygen, nitrogen and a mixture of oxygen and nitrogen, and
    (b) complementally up to 60% by weight of hard polymeric segments selected from the group consisting of a polymer having a glass transition temperature above 50° C., a polymer having a crystalline melting point above 100° C. and a polymer having a softening temperature above 100° C.;
said elastomeric polymer in the form of an unsupported film having a permeability constant for water vapour of at least 3000, a stress at 100% elongation of 50–4000 pounds per square inch, a permanent set of less than 20% and a tensile strength of at least 300 pounds per square inch.

2. The sheet material of claim 1 in which the elastomeric polymer contains 60–80% by weight of said soft polymeric segments from a polymer having a glass transition temperature below −60° C., said soft polymeric segments containing 20–40% by weight of an element selected from the group consisting of nitrogen, oxygen and a mixture of nitrogen and oxygen, and 40–20% by weight of said hard polymeric segments, said elastomeric polymer in the form of an unsupported film having a permeability constant for water vapor of 9,000–50,000, a stress at 100% elongation of about 200–1500 p.s.i., a permanent set of less than 5% and a tensile strength of about 3,000–50,000 pounds per square inch.

3. The sheet material of claim 1 in which said substrate to which finish B is adhered is a microporous sheet material of a porous substrate of a non-woven needled batt impregnated with a polymeric material having adhered thereto a microporous synthetic polymer coating (A) in which the synthetic polymer has a secant tensile modulus at 5% elongation of above about 600 pounds per square inch.

4. The sheet material of claim 3 in which the polymeric component of the porous substrate and the microporous coating is at least 50% by weight of a polyurethane and up to 50% by weight polyvinyl chloride.

5. The sheet material of claim 1 in which the soft polymeric segment is from a poly(alkyleneether) glycol having a glass transition temperature of −40° C. to −90° C. and a molecular weight of about 500–1,000,000.

6. The sheet material of claim 2 in which the soft polymeric segment is from a poly(tetramethyleneether) glycol having a molecular weight of 500–5000.

7. The sheet material of claim 2 in which the soft polymeric segment is from a poly(propyleneether) glycol having a molecular weight of 500–5000.

8. The sheet material of claim 1 in which the soft polymeric segment is from a polyester having a glass transition temperature of −40 to −90° C. and having a molecular weight of about 500–1,000,000.

9. The sheet material of claim 8 in which the polyester is the reaction product of an aliphatic dicarboxylic acid having 3–12 carbon atoms and a glycol 3–12 carbon toms.

10. The sheet material of claim 8 in which the polyester is a poly(epsilon-caprolactone).

11. The sheet material of claim 1 in which the soft polymeric segment is a poly(siloxane) having a glass transition temperature of −60 to −150° C. and a molecular weight of 500–1,000,000.

12. The sheet material of claim 2 in which the soft polymeric segment is a poly(dimethylsiloxane) having a degree of polymerization of at least 18.

13. The sheet material of claim 2 in which the soft polymeric segment is a poly(phenylmethylsiloxane) having a degree of polymerization of at least 6.

14. The sheet material of claim 1 in which the soft polymeric segment is from a poly(vinyl alkyl ether) having a glass transition temperature of −20 to −60° C. and a molecular weight of about 500–1,000,000.

15. The sheet material of claim 1 in which the soft polymeric segment is from a poly(alkyl acrylate) having a glass transition temperature of −20 to −70° C. and a molecular weight of 500–1,000,000 and in which the alkyl group has 1–8 carbon atoms.

16. The sheet material of claim 1 in which the soft polymeric segment is from a hydrocarbon copolymer having a glass transition temperature of −30 to −80° C., a molecular weight of 500–1,000,000 and wherein the hydrocarbon units of said copolymer have 2–12 carbon atoms.

17. The sheet material of claim 16 in which the hydrocarbon copolymer is a copolymer of 60–30% by weight of units of ethylene and complementally 40–70% by weight of units of vinyl acetate.

18. The sheet material of claim 2 in which the hard polymeric segment is a polyurea, having a molecular weight of about 70–5,000, selected from the group consisting of a polyurea having a glass transition temperature above 50° C., a polyurea having a crystalline melting point above 100° C. and a polyurea having a softening temperature above 100° C.

19. The sheet material of claim 18 in which the polyurea is the reaction product of an aliphatic diisocyanate and an aliphatic secondary diamine.

20. The sheet material of claim 18 in which the polyurea is the reaction product 4,4′-methylene bis-(cyclohexyl isocyanate) and piperazine.

21. The sheet material of claim 18 in which the polyurea is the reaction product of hexamethylene diisocyanate and piperazine.

22. The sheet material of claim 18 in which the polyurea is the reaction product of xylylene diisocyanate and piperazine.

23. The sheet material of claim 18 in which the polyurea is the reaction product of toluene diisocyanate and piperazine.

24. A sheet material of claim 2 in which the hard polymeric segment is a polyurethane, having a molecular weight of about 70–5,000, selected from the groups consisting of a polyurethane having a glass transition temperature above 50° C., a polyurethane having a crystalline melting point above 100° C., and a polyurethane having a softening temperature above 100° C.

25. The sheet material of claim 24 in which the polyurethane has the following structure

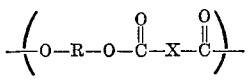

wherein R is selected from the group consisting of an alkylene radical of 2–20 carbon atoms and a cycloalkylene radical having 2–20 carbon atoms; X is a radical selected from the group

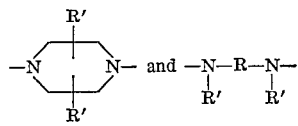

in which R' is selected from the group consisting of hydrogen and an alkyl radical having 1–10 carbon atoms and in which R is as defined above.

26. The sheet material of claim 24 in which the polyurethane has the following structure

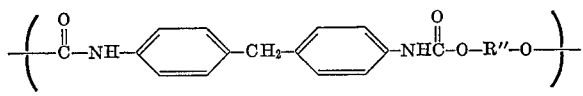

wherein R" is selected from the group consisting of an alkylene radical having 2–8 carbon atoms and a cycloalkylene radical having 2–8 carbon atoms.

27. The sheet material of claim 2 in which the hard polymeric segment is a polyester of an aromatic dicarboxylic acid and an aliphatic glycol having a molecular weight of about 70–5000 and a glass transition temperature of about 65–75° C.

28. The sheet material of claim 27 in which the polyester is poly(tetramethyleneterephthalate).

29. The sheet material of claim 2 in which the hard polymeric segment is a poly(carbonate) having a molecular weight of about 500–5000 and having a glass transition temperature of 125–225° C.

30. The sheet material of claim 29 in which the poly(carbonate) has the structural formula

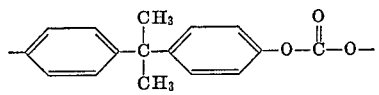

and has a glass transition temperature of 145–155° C.

31. The sheet material of claim 2 in which the hard polymeric segment is a vinyl addition polymer having a molecular weight of about 100–200,000 and is a vinyl addition polymer selected from the group consisting of a vinyl addition polymer having a glass transition temperature above 50° C., a vinyl addition polymer having a crystalline melting point above 100° C. and a vinyl addition polymer having a softening temperature above 100° C.

32. The sheet of material of claim 2 in which the elastomeric polymer is the reaction product of the bis (chloroformate) of a poly(alkyleneether) glycol, the bis-chloroformate of a $C_1$–$C_4$ glycol and a secondary diamine having 3–18 carbon atoms.

33. The sheet material of claim 32 in which the elastomeric polymer is the reaction product of the bis (chloroformate) of poly(tetramethyleneether) glycol, molecular weight of about 1000–2000, bis(chloroformate) of 1,4-butane diol and piperazine.

34. The sheet material of claim 2 in which the elastomeric polymer compises at least 2 hard polymeric segments for each soft polymer segment and said segments are arranged to alternate along the polymer chain of said elastomeric polymer.

35. The sheet material of claim 36 in which the elastomeric polymer is the reaction product of poly(alkyleneether) glycol, an organic diisocyanate having 2–20 carbon atoms and a secondary diamine.

36. The sheet material of claim 34 in which the elastomeric polymer is the reaction product of poly(tetramethylene)glycol, molecular weight of 1500–3000, hexamethylene diisocyanate and piperazine reacted in a molar ratio of 1/1.5/0.5–1/4/3.

37. The sheet material of claim 34 in which the elastomeric polymer is the reaction product of poly(tetramethyleneether)glycol, molecular weight 1500–3000, 4,4'-methylene bis(cyclohexyl isocyanate) and piperazine reacted in a molar ratio of 1/1.25/0.25–1/2/1.

38. The sheet material of claim 34 in which the elastomeric polymeric polymer is the reaction product of a poly(alkyleneether)glycol, a diisocyanate have 2–20 carbon atoms and a $C_2$–$C_{20}$ glycol.

39. The sheet material of claim 34 in which the elastomeric polymer is the reaction product of poly(tetramethyleneether)glycol having a molecular weight of 1500–3000, 4,4'-methylene bis(cyclohexyl isocyanate), 1,4-butane diol reacted in a molar ratio of 1/1.25/0.25–1/4/3.

40. A vapor permeable coriaceous synthetic microporous sheet material comprising
   (1) a porous substrate of a synthetic polymeric material reinforced with fibers having adhered thereto a microporous synthetic polymer coating (A), and
   (2) about 0.1–5 mils of non-porous vapor permeable finish (B) in superimposed adherence with said microporous coating (A) and comprises an elastomeric polymer containing
      (a) 60–80% by weight of soft polymeric segments from a polymer that has a glass transition temperature below −60° C. and contains about 20–40% by weight of an element selected from the group consisting of nitrogen, oxygen and a mixture of nitrogen and oxygen, and
      (b) complementally 40–20% by weight of hard polymeric segments selected from the group consisting of a polymer having a glass transition temperature above 50° C., a polymer having a crystalline melting point above 100° C. and a polymer having a softening temperature about 100° C.;
said elastomeric polymer in the form of an unsupported film having a permeability constant for water vapor of 9,000–50,000, a stress at 100% elongation of about 200–1,500 p.s.i., a permanent set of less than 5% and a tensile strength of about 3,000–50,000 pounds per square inch; and having a layer of an acrylic polymer in superimposed adherence to the finish (B) and having a final coat of cellulose acetate butyrate in superimposed adherence to said acrylic polymer layer.

References Cited

UNITED STATES PATENTS

| 2,929,802 | 3/1960 | Katz | 260—45.7 X |
| 2,987,494 | 6/1961 | Black | 117—161 X |
| 3,067,482 | 12/1962 | Hollowell | 117—63 X |
| 3,067,483 | 12/1962 | Hollowell | 117—140 X |
| 3,100,712 | 8/1963 | Holden | 117—135.5 |
| 3,180,853 | 4/1965 | Peters | 117—161 |
| 2,962,470 | 11/1960 | Jung | 260—33.4 |

WILLIAM D. MARTIN, Primary Examiner

THEODORE G. DAVIS, Assistant Examiner

U.S. Cl. X.R.

117—11, 73, 138.8, 140, 161